United States Patent [19]

Wickmann et al.

[11] Patent Number: 4,630,379
[45] Date of Patent: Dec. 23, 1986

[54] LASER GAUGING SYSTEM AND COMPONENT PARTS THEREFOR

[75] Inventors: John T. Wickmann, Omemee; Richard Olak, Peterborough, both of Canada

[73] Assignee: Chart Industries Limited, Ontario, Canada

[21] Appl. No.: 529,201

[22] Filed: Sep. 2, 1983

[51] Int. Cl.⁴ ............................................. G01B 5/255
[52] U.S. Cl. ................................. 33/288; 33/180 AT
[58] Field of Search ............ 33/DIG. 21, 288, 174 R, 33/180 AT, 181 AT, DIG. 1; 356/153, 154, 155; 350/171, 172; 356/399, 401

[56] References Cited

U.S. PATENT DOCUMENTS

| | | | |
|---|---|---|---|
| 3,068,573 | 12/1962 | Sidwell | 33/DIG. 1 |
| 3,611,575 | 10/1971 | Chartier | 33/193 X |
| 3,778,169 | 12/1973 | Adams | 356/172 |
| 3,813,170 | 5/1974 | Sears | 356/138 |
| 4,015,338 | 4/1977 | Kunze et al. | 33/193 X |
| 4,031,633 | 6/1977 | Bjork | 33/288 |
| 4,193,203 | 3/1980 | LeGrand | 33/288 X |
| 4,366,624 | 1/1983 | Bergstrom | 33/288 X |
| 4,432,144 | 2/1984 | Carlsson | 33/288 X |
| 4,442,608 | 4/1984 | Clausen | 33/288 |

FOREIGN PATENT DOCUMENTS 2010996 6/1971 Fed. Rep. of Germany ........ 33/335

Primary Examiner—Harry N. Haroian
Attorney, Agent, or Firm—Weingarten, Schurgin, Gagnebin & Hayes

[57] ABSTRACT

The present invention relates to a laser gauging apparatus for measuring a vehicle during the construction of and the repair of the vehicle. The apparatus includes a T-shaped rail arrangement. On one of the rails, a laser carriage is mounted which carries a laser along the rail. Laser measuring instruments are mounted on the other rail. The laser gauging apparatus projects a beam having a horizontally extending portion and a vertically extending portion. The horizontally extending portion defines a horizontal datum plane under the vehicle from which measurements can be taken to the vehicle to determine the correct position of datum points on the vehicle. In accordance with the present invention there is also provided a laser target which can be suspended from the datum vehicle point. The target when suspended and when intersecting the laser beam, indicates that the vehicle reference datum point is in proper position.

20 Claims, 24 Drawing Figures

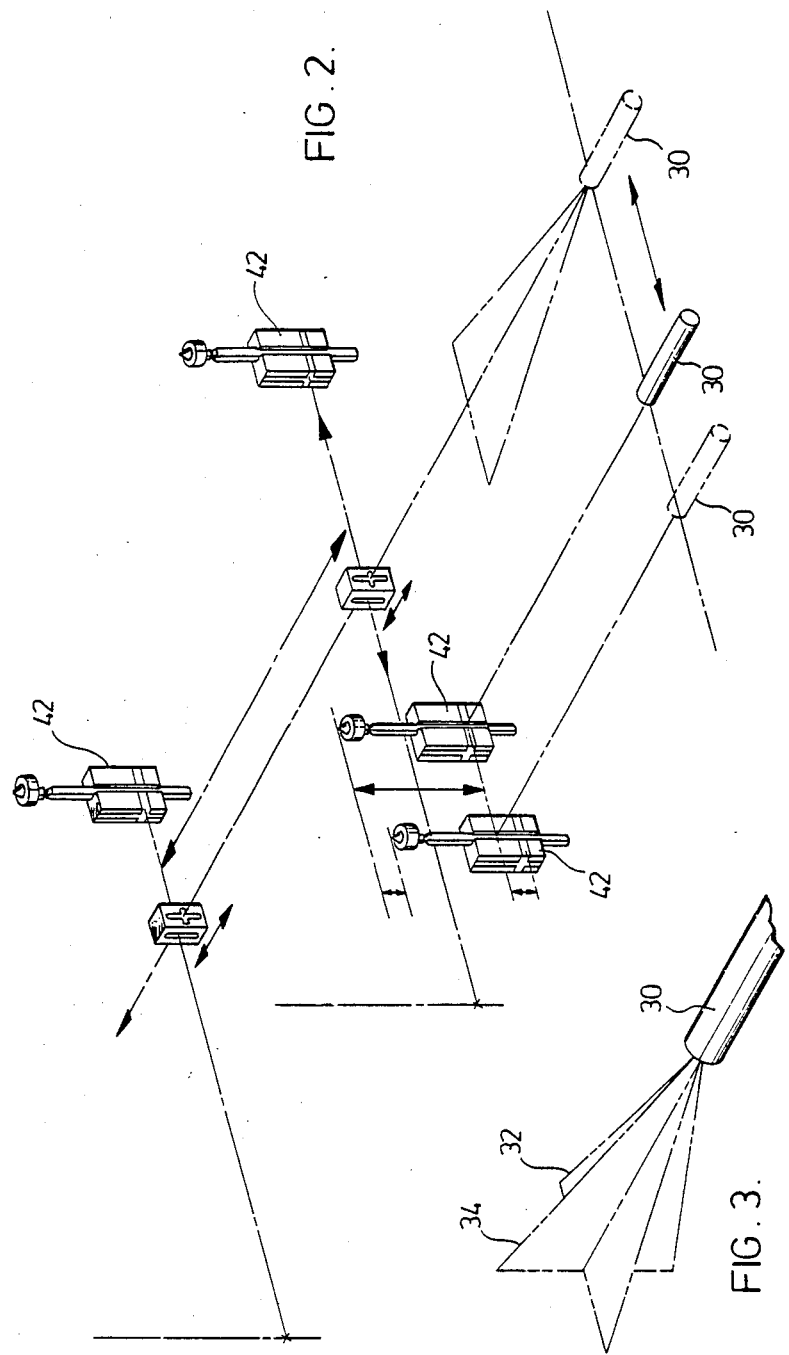

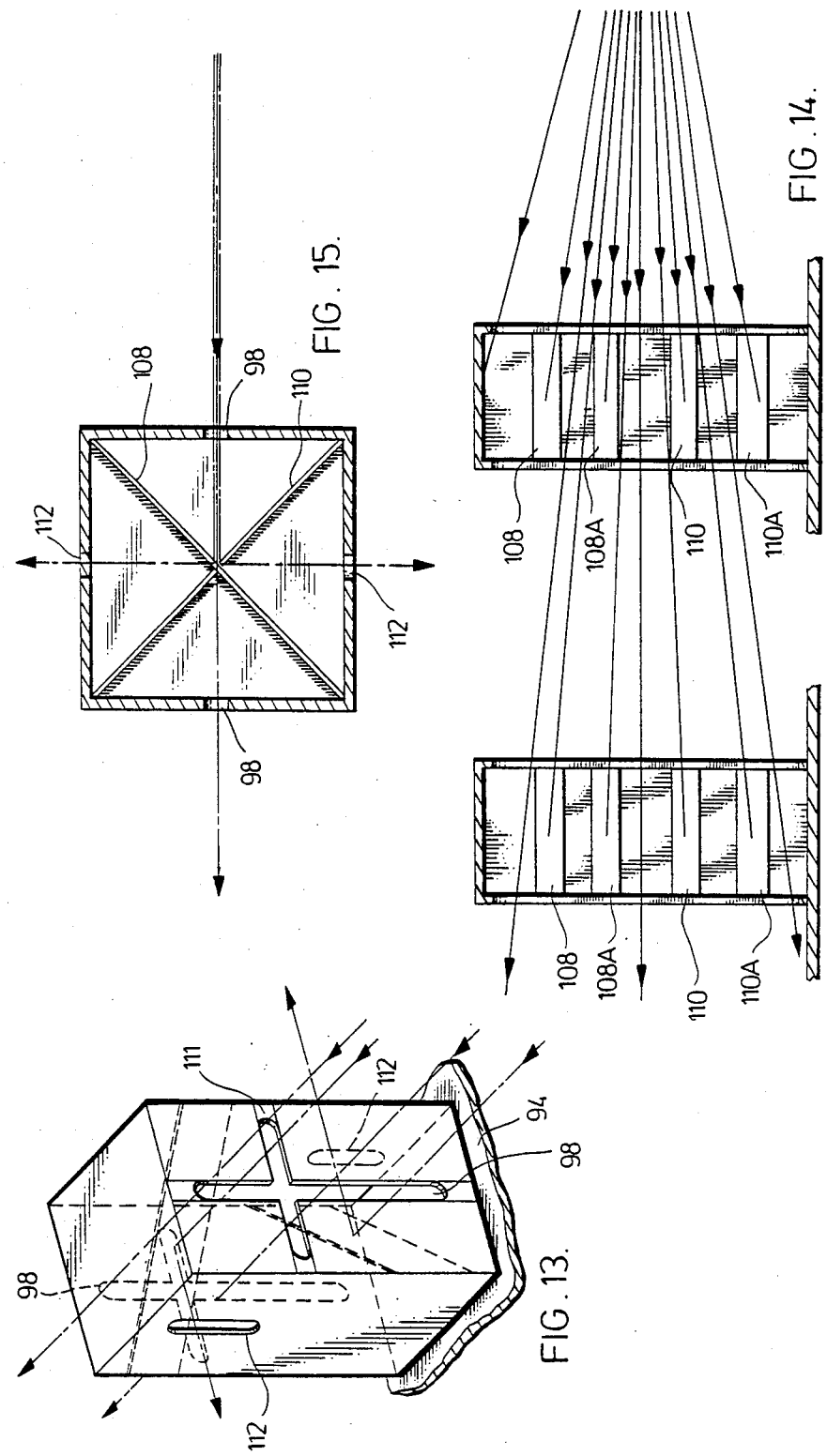

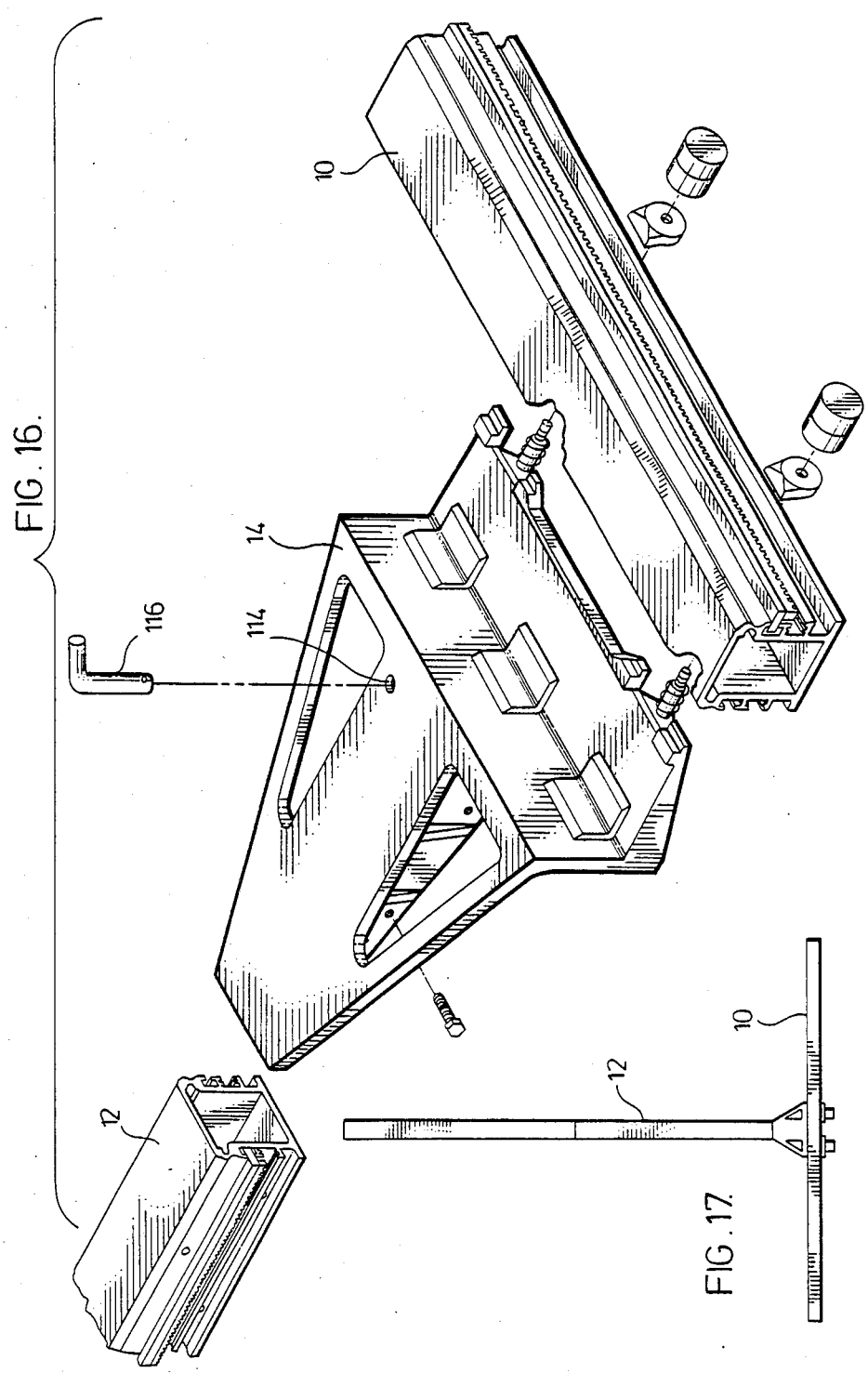

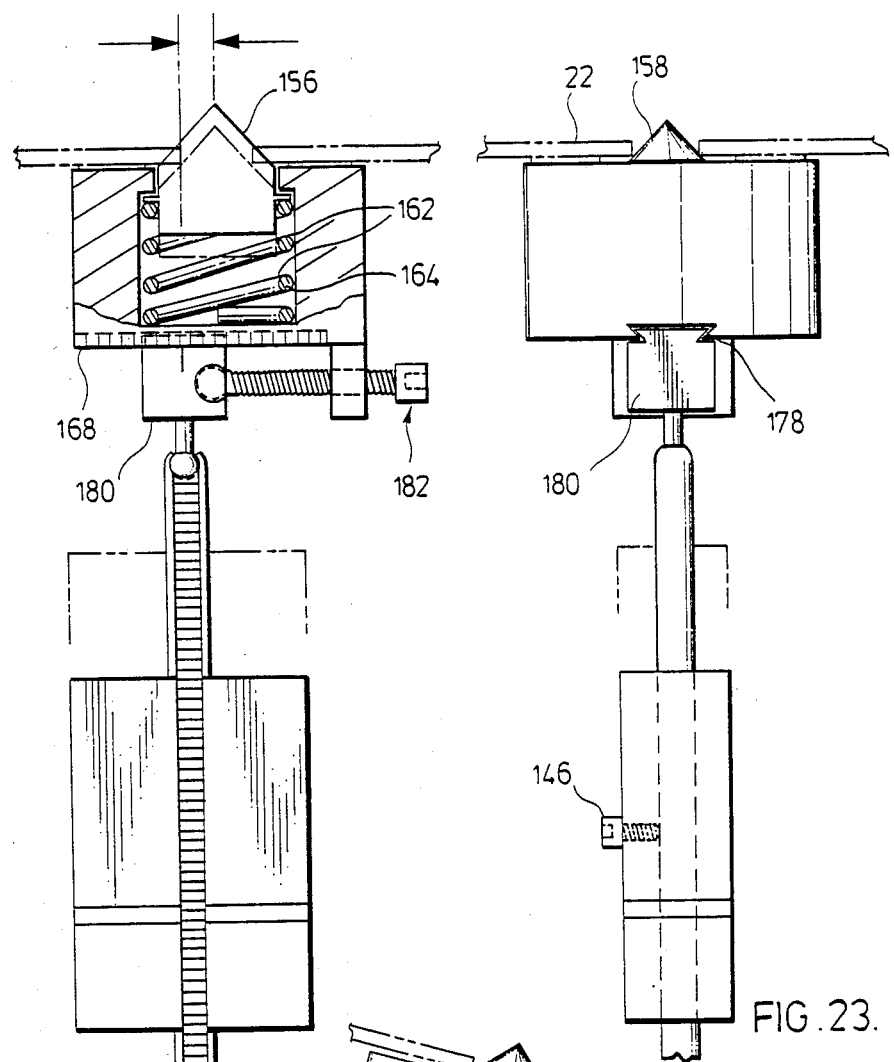
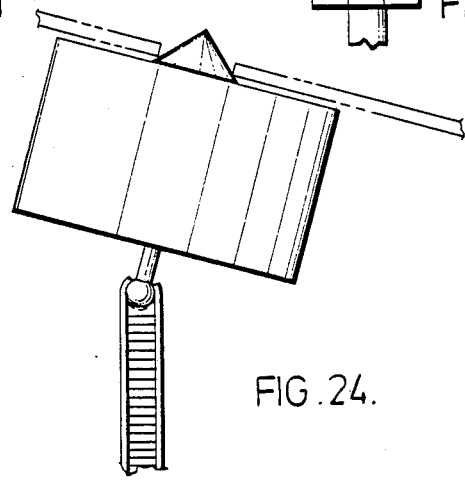
FIG. 22.
FIG. 23.
FIG. 24.

LASER GAUGING SYSTEM AND COMPONENT PARTS THEREFOR

The present invention relates to a laser gauging apparatus for measuring a vehicle during the construction of and repair of the vehicle.

Gauging apparatus are useful in the repair of automobiles having being damaged in a collision. Gauging systems are also useful for realignment of automobiles and for checking during the initial construction of the automobile whether or not the vehicle has been constructed within manufacturing tolerances.

For the most part, gauging systems for measuring vehicles such as automobiles may comprise a series of rails running beneath the automobile defining a reference for the automobile. Expandable measuring gauges are slidably mounted on these rails for movement beneath the automobile. These gauges usually include pointers which can be brought up into engagement with vehicle datum points. The rails and gauges are calibrated such that the pointers can be positioned where one would expect to find a vehicle reference datum point. This can be done by obtaining the proper position for the vehicle datum point from manufacturing drawings for the automobile. Accordingly, the pointer indicates whether or not the datum points of the vehicle are in the correct position. If these datum points are not in the correct position, then the body of the car may be pulled by suitable pull means so as to bring the datum point into its correct position above the pointer.

More sophisticated laser gauging apparatus for use in the measuring of a vehicle during repair and construction of a vehicle have been developed recently. These gauging apparatus usually involve the placement of a laser on a rail system about the vehicle and the laser projects a circular beam of light down the side of the vehicle or beneath the vehicle from which measurements can be taken.

The present laser gauging apparatus are not believed practical for the intended purpose of taking measurements with respect to the vehicle because it is difficult to take measurements form a circular beam. Also, accurate targets have not been developed for use in association with the circular laser beam. Another problem with the prior art laser systems is that the relative movement of the laser with respect to the vehicle must be manually measured. This presents problems should one wish to check the positions of the laser with respect to the centerline or other positions of the vehicle as the operator must reach beneath the vehicle to take many of these measurements. Further, by projecting a circular light beam, the light beam is difficult to shine on one or more targets arranged behind each other and as a result the use of the system is somewhat limited. While instruments have been developed which deflect the beam at right angles to its path of travel, it should be understood that this type of beam deflection limits the number of targets which can be observed at any one time. With respect to targets used, there has been no apparent development of targets which may be suspended from the datum on the underside of the vehicle and accordingly all measurements to vehicle datum are made manually or by some other means in which target means are supported beneath the vehicle.

It is therefore an object of the present invention to provide a laser gauging apparatus which allows for the three dimensional measurement of a vehicle datum point.

It is another object of the present invention to provide a laser gauging apparatus wherein the relative position of the gauging instruments used with the apparatus is either known or pre-set such that the use of tape measures in is not required.

It is a further object of the present invention to provide a target which is self-supporting from the underside of the vehicle datum points.

It is still a further object of the present invention to provide a laser gauging apparatus that projects its beam onto one or more measuring instruements aligned behind one another.

In accordance with a broad aspect of the present invention there is provided a laser gauging apparatus for measuring of a vehicle during construction of and repair of the vehicle. The apparatus includes a support means positionable below the vehicle. The apparatus includes a laser means mounted on the support means for projecting at least one horizontally extending beam portion beneath the vehicle. The horizontal beam portion defines a horizontal datum plane under the vehicle from which measurements to the vehicle are obtainable. By providing a horizontal datum plane projected beneath the vehicle instead of a circular beam, the present invention provides a datum plane beneath the vehicle from which all measurements to the vehicle datum reference points can be readily otained.

The laser means may additionally project a vertical beam portion which defines a vertical datum plane. The support means may comprise a first elongate rail means and the laser means may include a laser adjustably mounted on first carriage means. The first carriage means is slidable along the first elongate rail means such that the horizontal datum plane may be moved from the left to right beneath the vehicle and the vertical datum plane may be positioned either beneath the center line of the vehicle or to the side of the vehicle. Accordingly, measurements can be readily taken from the vertical reference beam to the sides of the vehicle.

In the preferred construction of the apparatus, the apparatus includes a second elongated rail means secured at right angles to the first rail means and extending beneath the centerline of the vehicle. The second elongate rail means is adapted to carry measuring instruments. In the preferred construction adjustable support means are provided for horizontally supporting the first and second rail means above a base such as, for example, a platform or a floor above which the vehicle is securely mounted.

Along the second rail means there may be provided a plurality of second carriage means which include a housing having at least two beam splitters located therein and spaced apart from each other. This housing is provided with first opposing slots in alignment with the direction of projection of the laser beam portions. The housing further includes second elongated slots which are located at right angles to the first opposing slots. The beam passes through one of the first opposing slots and portions of the beam are deflected at right angles by the beam splitters while the remaining portion of the beam pass through the other of the first opposing slots. The first opposing slot may also have a horizontal portion such that the horizontal portion of the beam passes through the housing and only portions of the vertical portion of the beam are deflected to the right and left at right angles of the direction of the beam. By splitting only a portion of the beam and allowing most of the remainder of the beam to pass through and around the housing, more than one of these instruments may be aligned along the center line of the vehicle such that a plurality of beam portions extending at right angles to the direction of travel of the beam may be projected onto targets suspended from the bottom of the automobile. As can be appreciated, the effectiveness of using more than one of the beam splitting housings is enhanced when the horizontal and vertical beam portions of the laser diverge or spread.

In addition to the second carriage means provided on the second elongated rail means extending beneath the centerline of the vehicle, there may be provided third carriage means that lie in a plane parallel to the horizontal datum plane and includes base frame members mounted on the third carriage means which extend parallel to the first elongate rail means beneath the front end of the vehicle. Upstanding frame members are provided extending upwardly of the base frame members beside the vehicle. An upper horizontal extending frame member lies in the vertical plane defined by one of the lower base frame members is also provided and two or more pointers which extends downwardly into the engine compartment or other areas of the vehicle from the upper horizontally extending frame member. Further, pointers may extend horizontally from the upstanding frame members into the side of the vehicle. By providing for the adjustments of the third carriage means to lie in a plane parallel to the horizontal datum plane, this gauging instruement is suitable for taking measurements inside and above the engine compartment and along the side of the vehicle. It should be understood that by permitting for various adjustment of the third carriage means, the third carriage means can compensate for any irregularity in the straightness of the second rail means.

In accordance with another aspect of the present invention there is provided a laser target apparatus for measuring a vehicle with a laser beam during construction of and repair of the vehicle. The target apparatus includes a target having indicia mark thereon at predetermined locations. The indicia are indicative of the correct positon of the vehicle datum when the laser beam is projected onto the indicia. The target apparatus includes a target support means having a first engaging end and a second lower end. The first upper engaging end includes means for releasably engaging the vehicle datum. The second lower ends includes means for vertically suspending the target irregardless of the relative position of the target support means to the vehicle datum.

In the preferred construction the releasable engaging means includes magnets in the first upper end of the target support means. The magnet holds the target and the target support means in contact with the vehicle datum point. Alternatively, the target may be held by mechanical means such as spring clamps or the like. In the preferred construction the releasably engaging means further includes a conically shaped member protruding from the center of the first upper end for locating the target support means in a datum hole on the underside of the vehicle. The conical shaped member is recessed in the aperture in the first upper end and is spring biased out of the aperture. The vertical suspension means includes a first connecting ball member which protrudes outwardly of the second lower end and terminates in a substantially ball shape. The target includes a second connecting socket member which partially surrounds the first connecting member to define a ball and socket joint therewith. In the preferred construction, the vertical suspension means is moveable in a track provided in the second lower end of the target support means. Furthermore, indicia are provided so as to measure the distance that the vertical suspension means has been moved from the center of the target support means.

The target of the present invention finds particular advantage in that by providing a conically shaped member which may be pushed into the datum reference hole, this allows for the target to be centered directly beneath the datum point of the vehicle. Furthermore, by providing magnetic means, the target may be readily suspended from the vehicle at the reference or vehicle datum point. By providing the vertical suspending means, the target is suspended vertically irregardless of whether or not the particular datum point or hole may be offset with respect to its proper position due to the vehicle being damaged. Lastly, by providing the tracking feature in the second surface of the target support means, this will allow for relative measurements to be made between datum holes. In certain spec sheets, the distance between the datum holes is measured either from the center of the hole or from the edge of the hole. By allowing the target to be tracked relative to the target support means, the target compensates for any measurements that are to be taken from the outer edges of the datum points.

In accordance with another aspect of the present invention there is provided a beam splitting laser target for measuring a vehicle with a laser beam during construction of and repair of the vehicle. The beam splitting laser target includes a carriage adapted to move along an elongate rail and a housing adjustably mounted on the carriage means. The housing has first opposing slots in alignment with the direction of projection of the laser means. The housing has second elongate slots located at right angles to the first opposing slots. There are at least two beam splitting means mounted in the housing to deflect at least one portion of the beam entering one of the first opposing slots in a direction through one of the second slots and to deflect at least a second portion of the beam entering the one of the first opposing slots in a second direction through the other of the second slots. The remainder of the beam entering the housing passes through the other slot of the first opposing slots. By providing such beam splitting targets, the beam splitters allow for measurement of the longitidinal displacement of the reference datum points on the vehicle. This is because the deflected portions of the beams intersect with displaced targets. The distance between the reference datum of the vehicle is obtained by measuring the distance between the longitudinal displaced beam splitting targets on the second rail.

It should be understood that the beam deflecting portions may comprise mirrors which re-direct whole portions of the beam or may comprise beam splitters which re-direct portions of the beam while allowing other portions to pass therethrough.

In accordance with another aspect of the present invention there is provided a gauging apparatus for measuring a vehicle during construction of and repair of the vehicle. The apparatus includes elongate rail means positionable relative to the vehicle. The rail means include indicia spaced at predetermined intervals along the rail means. There is also provided a carriage means moveable along the rail means. The carriage means includes sensing means for sensing the indicia to determine the position of the carriage means on the rail means.

In the preferred construction the gauging apparatus includes a display means for displaying the relative position of co-ordinates of the carriage on the rail means. The indicia will include in the preferred construction a rack attached to the elongate rail means and sensing means in the preferred construction includes a pinion carried by the carriage wherein the pinion is in meshing engagement with the rack. The sensing means counts the rack teeth to determine the relative position at coordinates of the carriage. The provision of this particular type of measuring apparatus on the carriages of the present invention allows for the relative positions of each of the carriages to be readily ascertained without the use of manual tape measures. Alternatively, electrical or electronic sensing may be achieved by means of a scanner.

For a better understanding of the nature and objects of the present invention reference may be had by way of example to the accompanying drawings in which:

FIG. 2 is an illustration showing the deflection and projection of the laser beam in the present laser gauging apparatus;

FIG. 3 is an illustration showing the horizontal and vertical beam portions of the light projected by the laser used in the laser gauging apparatus of the present invention;

FIGS. 13, 14 and 15 are illustrations of the housing for the beam splitting target apparatus of the present invention showing the travel of laser beam through the housing;

FIG. 16 is a perspective exploded view showing the interconnection of the first and second rail means;

FIG. 17 is a plan view showing the interconnection of the first and second rail means at right angles to form a generally T-shapped arrangement;

Figure 1:
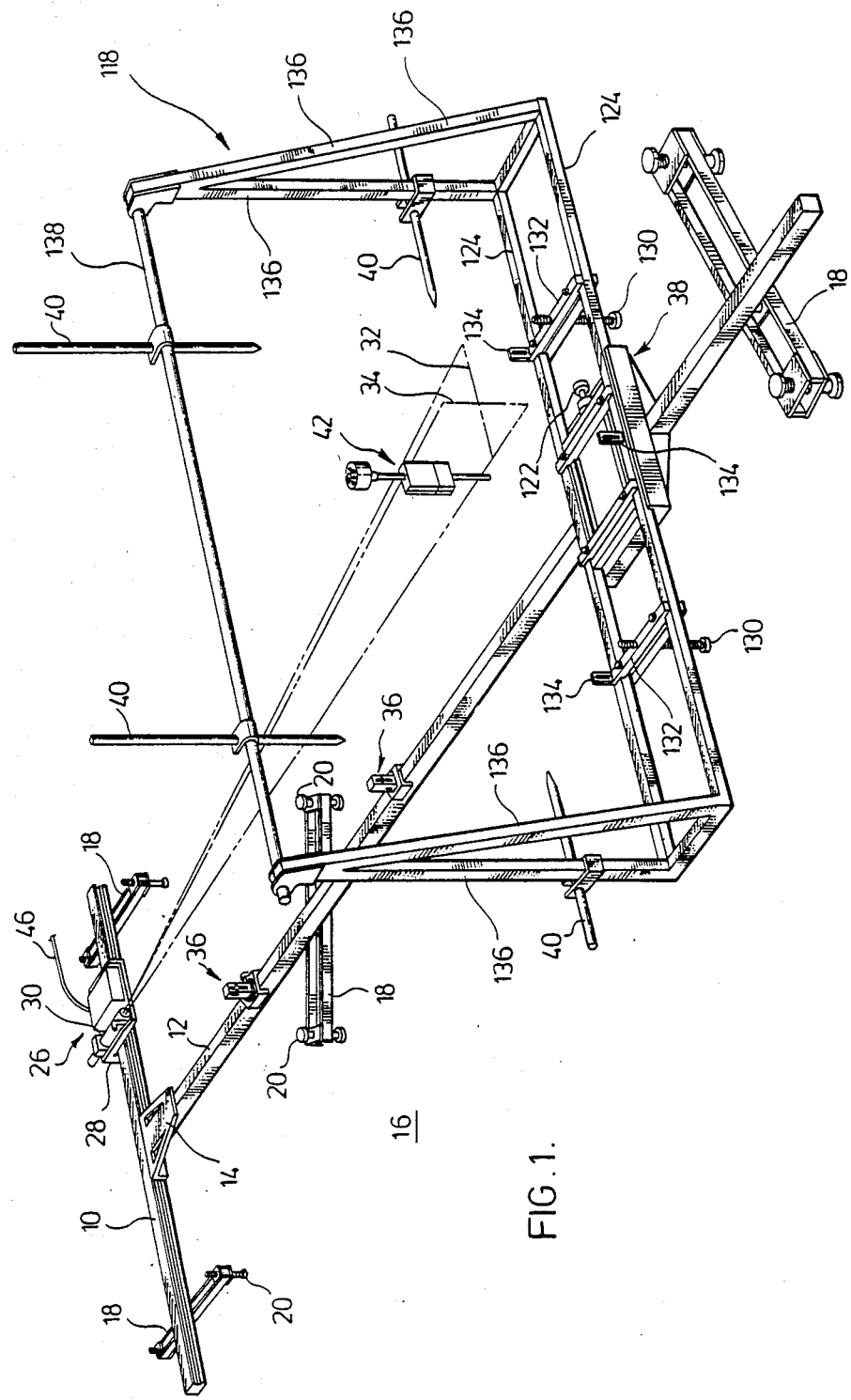
FIG. 1 is a perspective view showing the overall structure of the laser gauging apparatus of the present invention.
Figure 4:
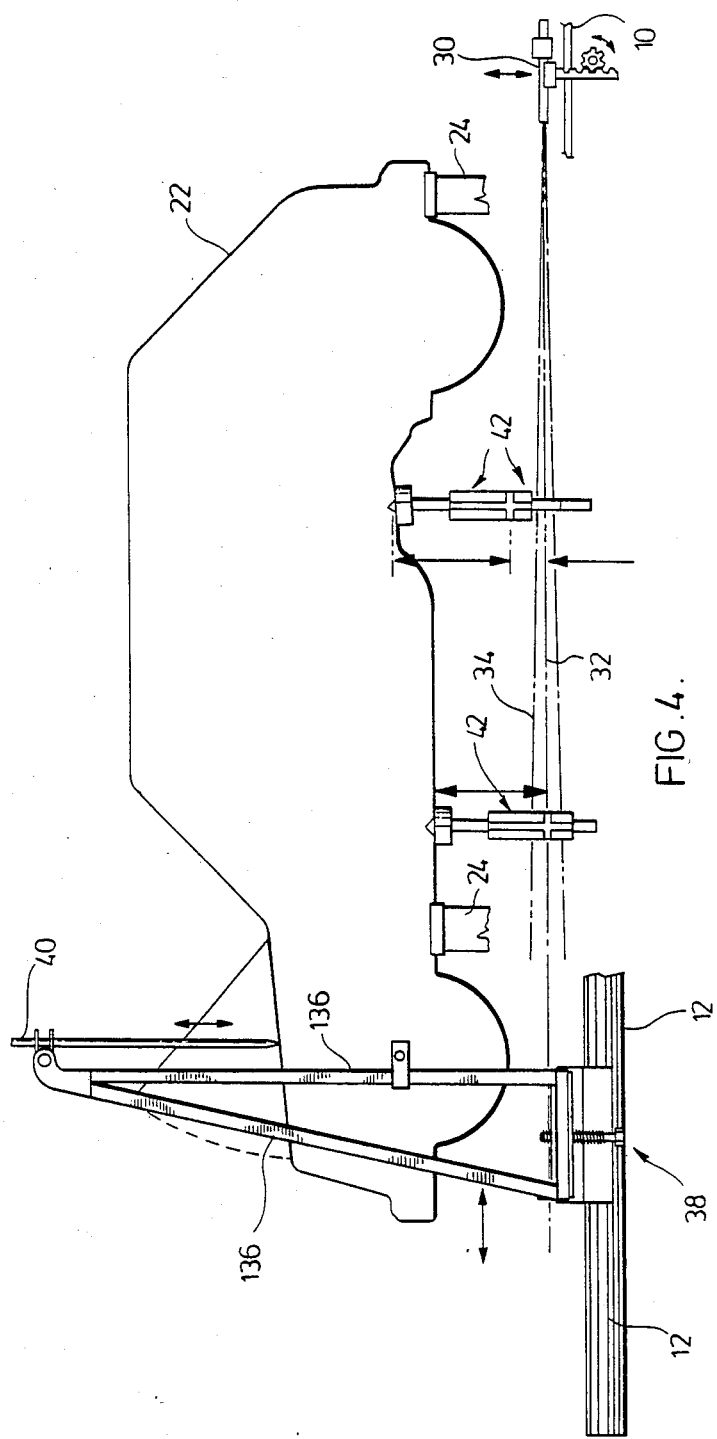
FIG. 4 is a side plan view showing the use of the laser gauging apparatus taking measurements from a vehicle.
Figure 5:
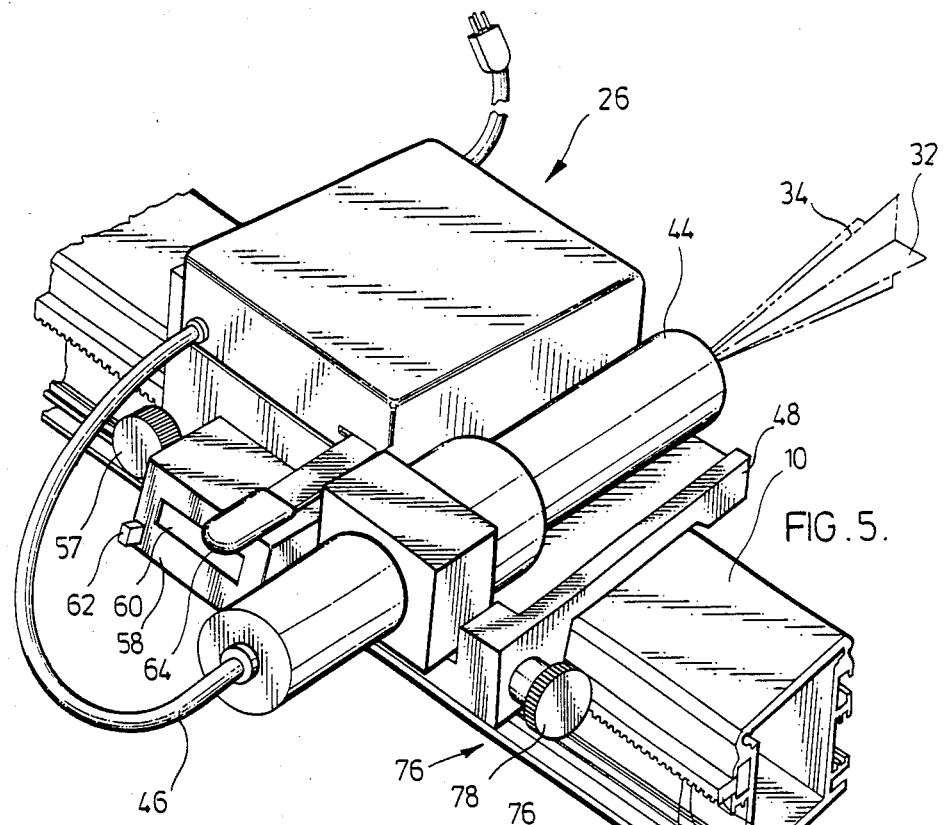
FIG. 5 is a perspective view of the laser means of the present invention shown mounted on the laser support means.
Figure 6:
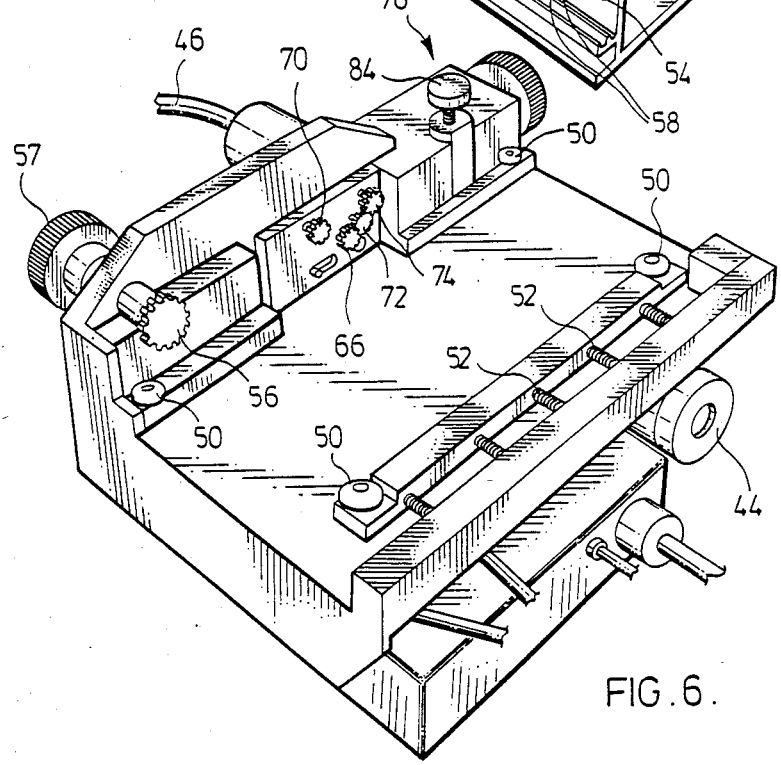
FIG. 6 is a bottom perspective view of the laser means of the present invention.

Referring now to FIGS. 1 and 4 the structure and function of the laser gauging apparatus of the present invention is described.

The laser gauging apparatus of the present invention has a first elongate rail means 10 joined at right angles to a second elongate rail means 12 by an interconnecting member 14. The first and second elongate rail means 10 and 12 are supported above a base 16 by means of adjustable support members 18. Adjustable support members 18 may be jacked upwardly and downwardly at 20 so as to position the elongate rail means 10 and 12 on a horizontal plane. The first elongate means 10 is positionable below the vehicle 22 and, as shown in FIG. 4, the elongate rail 10 is not positioned beneath the vehicle. Elongate rail 12 is positioned below and beneath the vehicle 22. The vehicle is secured above base 16 by securing means 24. The rail 12 is secured under the centerline of the vehicle.

The elongate rail 10 carries a laser means 26. Laser means 26 comprises a carriage 28 slidable on rail 10 and a laser 30 mounted on a carriage. As shown in FIGS. 1 and 3 the laser 30 projects a beam having a diverging or spreading horizontal beam portion 32 which defines a horizontal reference plane beneath the vehicle when rails 10 and 12 are adjusted by adjustment support means 18 to lie in a horizontal plane. The laser 30 also projects a vertical beam portion 34. Measuring laser instruments are provided on elongate rail means 12. These instruments include a beam splitting laser target 36 on a second rail means and a third carriage means 38. Third carriage means 38 supports pointer members 40 which extend into the vehicle from above the vehicle or beside the vehicle. The laser gauging apparatus includes a laser target 42 which is positionable in a datum hole on the underside of the vehicle 22.

Prior to discussing the overall operation of the laser gauging apparatus of the present invention, a more detailed description of each of the components of the apparatus is first described.

Referring to FIGS. 5 through 9, the laser means 26 of the present invention is shown in detail. Laser means 26 is mounted on a support means comprising the first elongate rail means 10. The laser means 26 projects a spreading beam having a horizontal beam portion 32 and a vertical beam portion 34.

Power to the laser 44 of the laser means 26 is provided by an electrical conducting cable 46 which may be pluged into a standard electrical outlet. The laser 44 is adjustably mounted onto a carriage 48. Carriage 48 is slidable along the rail 10. In this manner, the laser 44 may be moved to the left and right of the centerline of the vehicle and positioned such that the vertical beam portion 34 may be projected either beneath or beside the vehicle.

Figure 7:
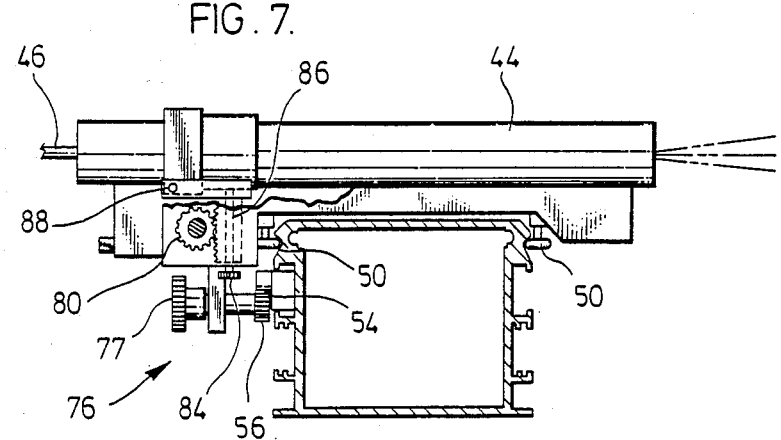
FIGS. 7, 8 and 9 are illustrative of the various adjustments in which the laser barrel of the laser means of the present invention may be adjusted.
Figure 8:
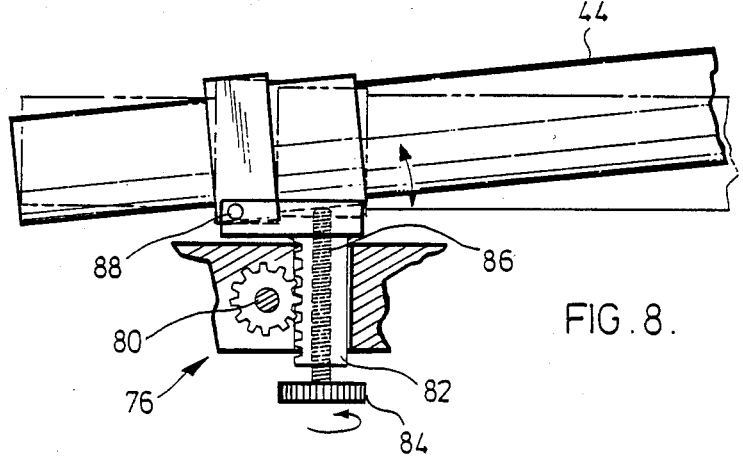
Figure 9:
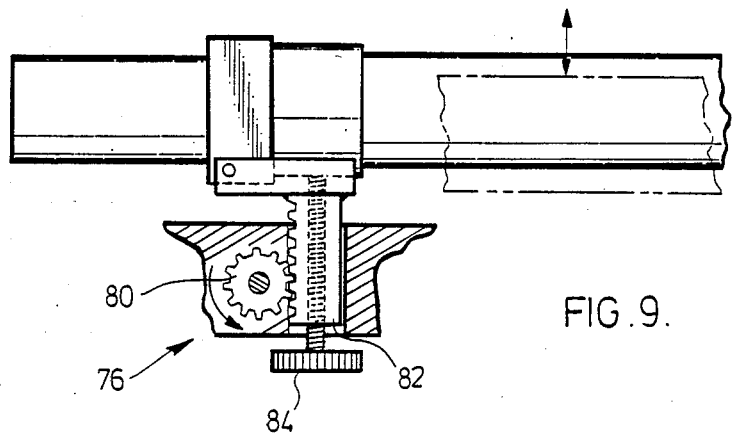
Figure 10:
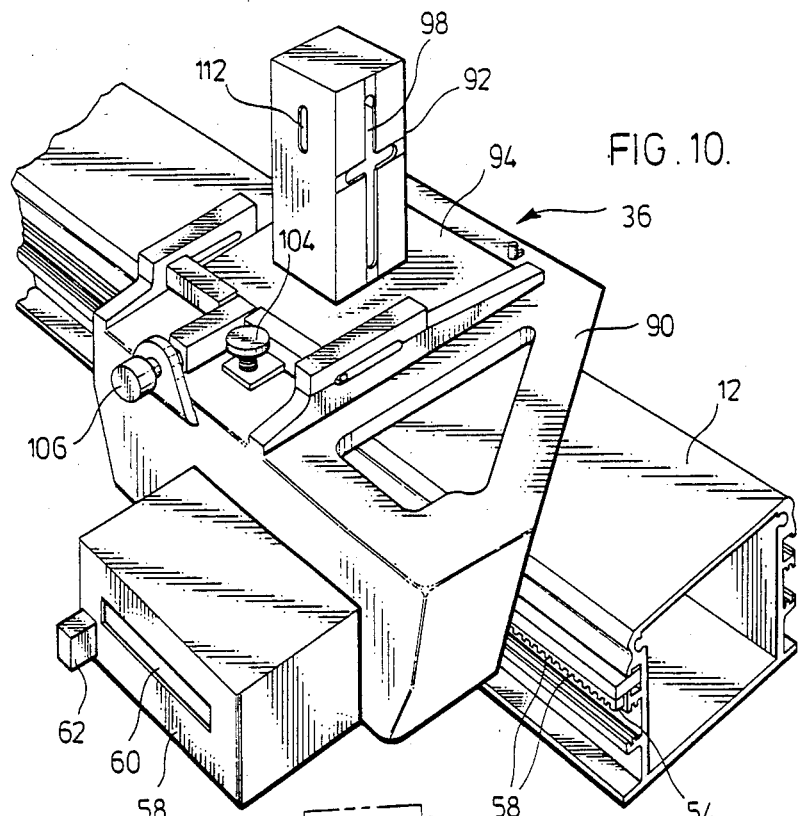
FIG. 10 is a perspective view of the second carriage means and beam splitting laser target apparatus of the present invention.
Figure 11:
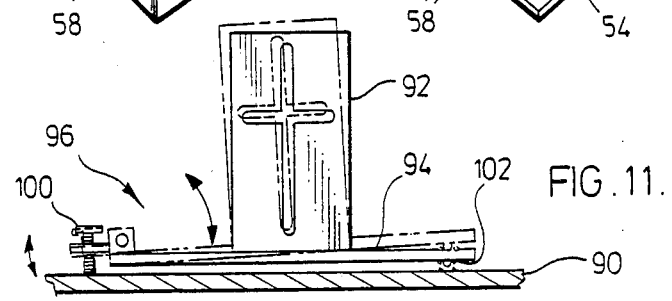
FIGS. 11 and 12 are illustrative of the adjustments of the beam splitting target apparatus of the present invention.
Figure 12:
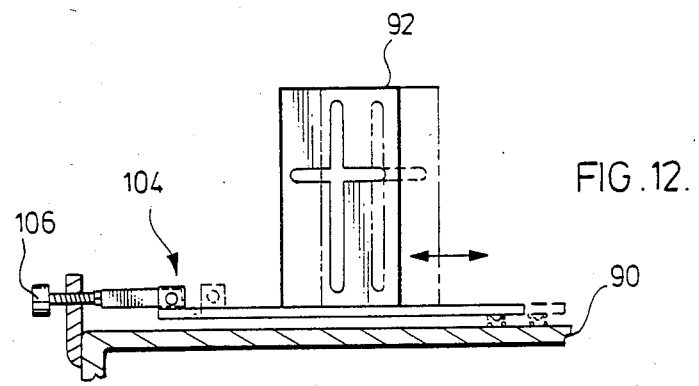

The underside of the carriage is provided with wheels 50 which engage grooves on the rail means 10 (See FIG. 7). One pair of wheels 50 are spring biased towards the groove of the rail 10 by means of springs 52 (See FIG. 6).

The rail 10 (and also rail 12) are provided with a rack 54 which extends along the rail 10. A pinion drive 56 is attached to the carriage 48 and is located in meshing relation with the rack 54. A knob 57 is attached to pinion 55. Turning the knob 57 results in the carriage 48 moving along rail 10. The rack 54 provides a plurality of indicia or teeth 58 spaced apart at predetermined intervals along the rail means. The carriage is further provided with sensing means comprising pinions 66, 70, 72 and 74. Pinions 70 and 72 are interconnected in meshing relation with teeth 58 of rack 54. Pinion 66 is shown communicating with pinion 74 (see FIG. 6) through intermediate pinion 72. This causes pinion 66 to rotate in a first direction relative to movement of carriage 48 in a first direction along rail 10. By moving lever 64, pinion 66 can be moved into meshing engagement with pinion 70 to allow pinion 66 to rotate in the same direction when the carriage 48 is moved in the opposite direction. Pinion 66 is connected through gearing to a counter 58 and movement of lever 64 allows the counter to count up for any direction of carriage movement. The counter has a display 60 and a reset button 62. The counter is interconnected with the pinion 66 through appropriate gearing so as to convert the indicia 58 sensed by the pinion arrangement into a count which count is displayed on display 60. It should be understood that the gearing can be chosen such that the display is either in millimeters or inches. Reset botton 62 allows for the display to be cleared at any time.

Once the rails 10 and 12 have been positioned on a horizontal plane, the barrel of laser 44 may be adjusted by adjustment means generally shown at 76. Adjustment means 76 includes a first adjustment means or knob 78 which controls a pinion 80 which is in meshing relation with rack 82. The rotation of knob 78 rotates pinion 80 which raises and lowers the rack 82. As a result, the barrel of the laser 44 moves upwardly and downwardly depending on the rotation of the knob 78. This allows the horizontal datum plane defined by the horizontal beam portion 32 of laser 44 to be adjusted upwardly and downwardly. As a result, the horizontal datum plane can be positioned at its appropriate level below the vehicle. The adjustment means generally shown at 76 further includes a second adjustment means or control knob 84. Knob 84 is attached to screw 86 in the rack 82. When knob 84 is rotated, bolt 86 moves against the barrel of the laser 44 causing the laser 44 to pivot about pivot point 88. This allows the vertical beam 34 of the laser beam to be directed upwardly beside the vehicle when the carriage 48 is moved to a positon where the beam may be directed along the side of the vehicle. This adjustment also allows for the horizontal plane 32 of the beam to be set with the beam splitters 36 on beam 12.

Referring now to FIGS. 10 through 15 the beam splitting laser target 36 is described. The beam splitting laser target includes a second carraige means 90 which is slidable along the second elongate rail 12. The underside of the carriage 90 is not shown as it is similar in configuration to the underside of carriage 48 for the laser 44. In other words wheels are provided which engage opposing groves in the beam 12. The counter 58 is similar to that described in the carriage 48 and is provided with pinion arrangement in meshing relation with the indicia 58 of rack 54.

A housing 92 is adjustably mounted to the carriage 90. The housing 92 is secured to a plate 94. First adjustment means 96 (See FIG. 11) are provided to pivot the housing 92 relative to the carriage 90 so that the first opposing slots have their vertical and horizontal portions aligned with the vertical and horizontal portions of the laser beam when the laser is mounted along the centerline of the vehicle. The first adjustment means comprises a screw 100 which is turned to pivot the plate 94 about point 102. The plate 94 is moveable vertically by second adjustment means 104. Second adjustment means 104 comprise a thumb screw 106 which is turned to push the plate vertically. By providing the adjustment means 96 and 104 the first opposing slots 98 of the housing can be positioned in alignment with the horizontal and vertical beam portions of the laser beam. This adjustment is important as after some use, the beam 12 may exhibit some deformation such as twist or bend in the beam. The purpose of the beam splitting laser target is to deflect portions of the laser beam at right angles onto the sides of targets. This is accomplished in the preferred embodiment by using at least two spaced apart mirrors 108 and 110. The path of travel of the portions of the laser beam is shown in FIGS. 2, 13, 14 and 15. In the embodiment shown in FIG. 14 four spaced apart mirrors are utilized. The upper mirrors 108 and 108A deflect the beam in a first direction at right angles to its direction of entry and the second set of spaced apart mirrors 110 and 110A deflect the beam in a second direction at right angles to the path of entry of the vertical beam portion. By spacing the mirrors apart at predetermined intervals this allows for a larger portion of the vertical beam portion to pass through the beam splitting laser target housing and strike a second housing or third housing or how many housings are necessary placed behind the first housing 92. By providing four spaced mirrors, it is possible to place the second housing 99 almost immediately behind the first housing 92 in alignment with the beam. It should be understood that the size of the carriage may not allow the housings to be spaced closely adjacent to each other, however.

The housing is provided with first opposing slots 98 in the front and back end of the housing and second slots 112 at right angles to the first opposing slot. The first opposing slots comprise horizontal and vertical elongate slot portions forming the shape of a cross. The horizontal elongate slot portion is provided to allow the horizontal beam portion of the laser beam to pass through the housing and to facilitate proper target alignment with the beam. Indicia 111 on the face of the target also facilitate target positioning relative to the laser beam. As shown in the Figures, no mirror is provided along the horizontal plane. The only deflection of light is the vertical beam portions. Second slots 112 are positioned on opposing walls of the housing 92, however they are spaced above and below on opposing sides of a horizontal beam portion such that portions of the vertical beam are reflected outwardly through these slots.

Referring now to FIGS. 16 and 17 the T arrangement of the first rail 10 and the second rail 12 is shown. As shown in FIG. 17 due to the length of the rail, the rail 12 comprises two sections joined together. Interconnecting member 14 is a casting and is provided with an aperture 114 through which locking pin 116 passes. The locking pin 116 passes through corresponding hole in the carriage 48 such that carriage 48 may be positioned with the vertical extending beam portion 34 of laser 44 extending along the centerline of the beam 12.

Figure 18:
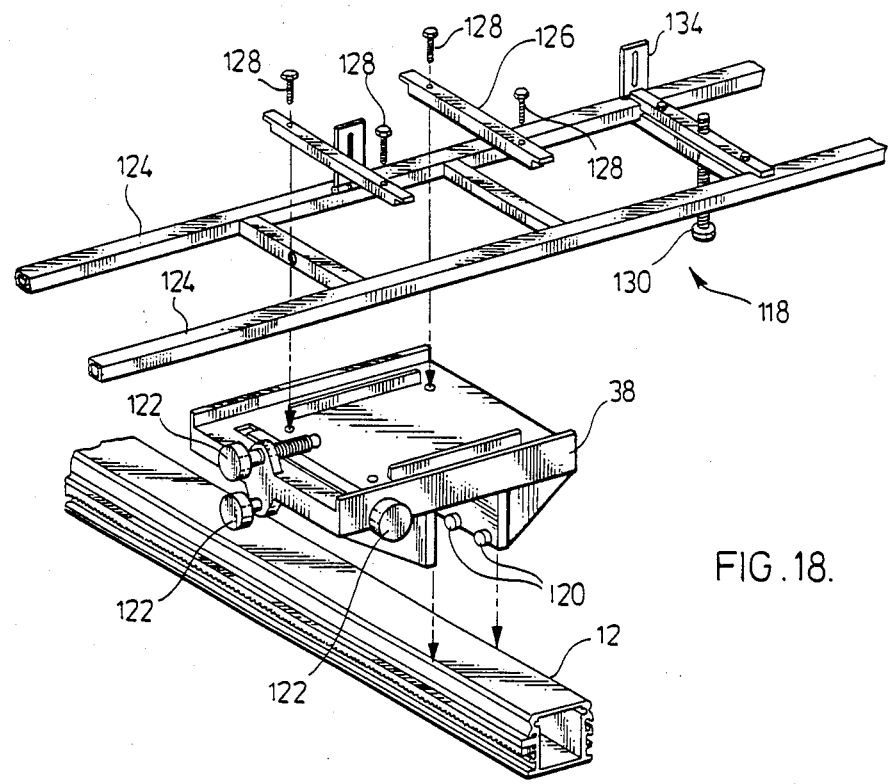
FIG. 18 is a partially exploded view of the third carriage apparatus of the present invention.
Figure 19:
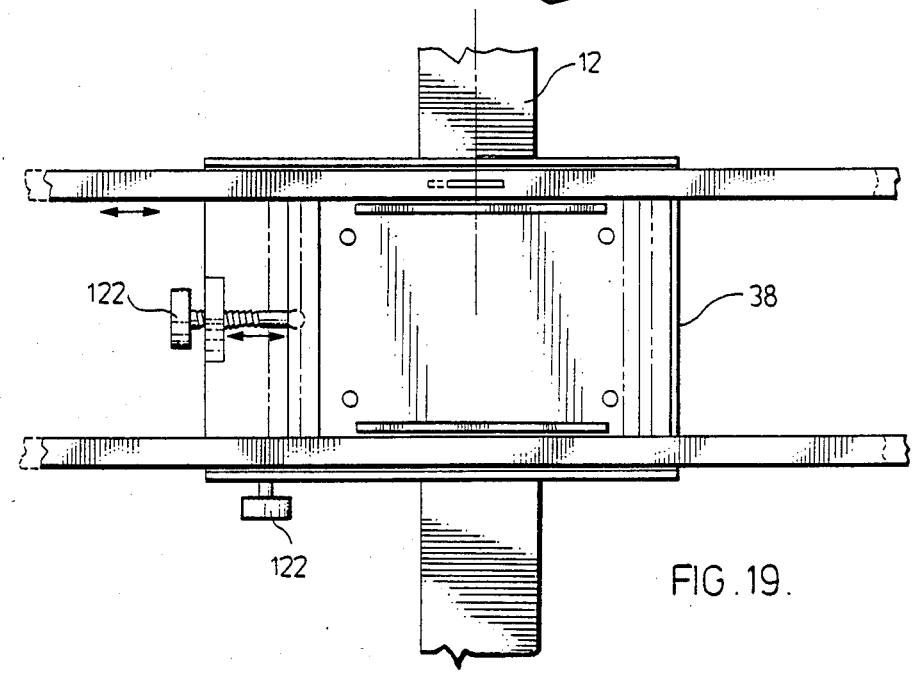
FIG. 19 is a plan view of FIG. 18.
Figure 21:
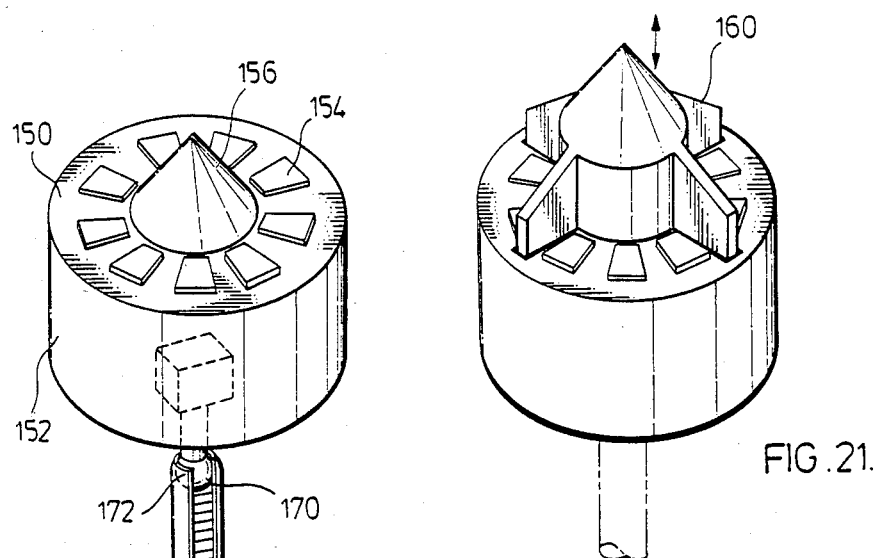
FIG. 21 is a partial perspective view of an alternative emobodiment for the target means of the present invention; and, FIGS. 22, 23 and 24 show the relative adjustments of the target means of the present invention with respect to its placement on a vehicle datum point.
Figure 20:
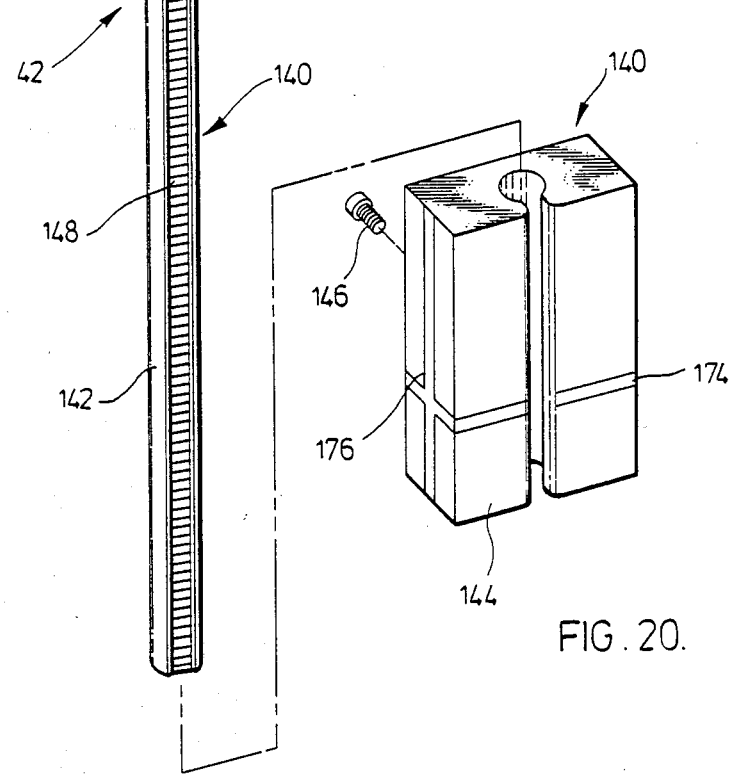
FIG. 20 is a exploded perspective view of the target apparatus of the present invention.

Referring now to FIGS. 1, 18 and 19 another measuring instrument used in laser gauging apparatus is shown generally at 118. The apparatus includes a third carriage means 38 slidably mounted by means of wheels 120 (not all of which are shown) which fit into opposing sides of grooves on rail 12. Carriage 38 is adjustable relative to the rail 12 to ensure that the carriage means lies in a plane parallel to horizontal datum plane. This adjustment is required because of irregularities that may occur in the rail 12 over its length. The carriage 38 may be factory set to the rail and is adjustable by means of knobs 122 to move the base member 124 horizontally or rotate the carriage about the beam. The third carriage means 38 and the base members 124 may be adjusted along the same lines as the housing 92 of the beam splitting laser target 36. The base members 124 are clamped to the carriage 38 by means of clamps 126 and bolts 128. Stabilizing members 130 are attached by the clamps 132 to the base member 124. The purpose of stabilizer 130 is to reduce the amount of movement of the outside portions of the base members 124. Targets 134 are provided to ensure that the base member 124 is aligned parallel to the horizontal datum plane. At the ends of the base members 24 are upstanding frame member 136 which extend upwardly on the outside portion of the vehicle. Attached to the top of the frame members 136 is an upper horizontally extending frame member 138 which lies in a vertical plane defined by the forward extending vertical base member 124. In this respect the relative position of the carriage means and the upper measuring bar 138 may be readily known by running a beaming splitting laser target 36 into engagement with the base member 124. The counter on the beam splitting laser target 36 displays the relative position of the carriage 38. The pointers 40 on the upper portion of the measuring bar 138 extend down into the vehicle engine compartment and are adjusted to engage the McPherson suspension in the vehicle. Pointers 40 on frames 136 point into the sides of the vehicle for measuring purposes. The upper measuring gauge may be provided with a measuring tape so that measurements can be readily taken from it.

Referring now to FIGS. 20 through 24 the laser target of the present invention is described. The laser target apparatus 42 includes a target 140 comprising an elongate rod 142 and a block 144 slidable along rod 142. The block 144 is securable with the rod 142 by means of screw 146 passing through an aperture in block 144 to engage elongate rod 142. Elongate rod 142 is provided with a plurality of indicia 148 which indicate the distance that the indicia are below the first end or face 150 of the target support means 152. Target support means 152 includes a plurality of magnets 154 at least partially embedded in face 150. The target support means 152 further includes a conically shaped member 156 which may be fitted into the aperture or datum reference point 158 of the vehicle 22. The conical shaped member 156 is shown in the alternate embodiment of FIG. 21 to have wings 160. The conical shape of the member including wings 160 allow the target support means 150 to be centered with respect to the datum aperture in the vehicle 22. The conical shape member 156 is recessed in aperture 162 of the support means. Springs 164 bias the conical shaped member 156 into engagement with the vehicle datum aperture 158. On the lower end 166 of the target support means 150 there extends a protruding member having a ball shape at its end 170. The upper portion of the rod 142 is provided with a socket 172 which surrounds ball 170 to form a ball and socket joint therewith. The ball and socket joint permits the vertical alignment of the target 140 relative to the target support means 152 irregardless of the position of the reference datum 158 (See FIG. 24 for example). The target 140 is provided with indicia 148 and indicia 174 and 176 on the block 144. This indicia allows for the three dimensional position of the target when all indicia are struck or intersect portions of the laser beam project thereon. In one of the preferred embodiments for the target shown in FIGS. 22 and 23, the second end 168 of the target 152 is provided with a track 178 along which the protruding member 180 travels. The location of the protruding member is fixed by means of a screwing device or apparatus 182. Indicia are also provided so as to determine the distance that the protruding member 180 has been moved relative to the center position of the support means 152. As mentioned previously the tracking means allows for measurements to be taken from the outside diameters of the aperture of the vehicle datum and these outside dimensions are often the dimensions on the spec sheet.

For a better understanding of the overall operation of the present laser target apparatus, reference may be had to drawings in which the operation of the apparatus is described.

As previously mentioned, the rails 10 and 12 are aligned on a horizontal datum above the base 16 by means of adjustable support means 18. At this time the laser 26 may be adjusted vertically such that its horizontal datum plane defined by its horizontal beam portion 32 is at a predetermined distance below the vehicle 22. The vehicle 22 is mounted relative to the base by means of the support members 24.

Measurements are taken from the vehicle while using the laser gauging apparatus. This is accomplished by projecting the laser beam at targets 42 suspended from the underside of the vehicle 22. As shown in FIGS. 2 and 4 when a target is not in its proper position the vehicle may have to pulled by suitable pull means. For example, if the vehicle is damaged due to a collision the body may have to be pulled so that the datum points are brought into their proper position. The proper position of the datum points is achieved by having the targets aligned in relative positions to one another as set out in the specification sheets. The laser can be moved along rail 10 so that the horizontal beam portion is directed at indicia 174 on the target and so that the vertical beam portion is on indicia 148. When the beam intersects these two indicia on the target when the vehicle datum point is correct from two dimensions. The beam can then be projected down the vehicle centerline and deflected through the beam splitting laser target onto the target suspended from the vehicle. When the deflected beam portion also intersects indicia 176 on the target, the vehicle datum point will be at its correct position to three dimensions.

The position of the target on the reference datum may be adjusted by moving the target in its track on the support means so that proper distances between first and second displaced targets can be properly determined. It is not necessary these distances be manually measured as counters provided on the carriages provide the proper distance measurements.

We claim:

1. A laser gauging apparatus for measuring a vehicle during construction of and repair of said vehicle, said apparatus comprising:
   support means positionable below said vehicle;
   laser means mounted on said support means for projecting said least one horizontally extending beam portion beneath said vehicle, said horizontal beam portion defining a horizontal datum plane under said vehicle from which measurements to said vehicle are obtainable, said laser means additionally projecting a vertical beam portion which defines a vertical datum plane, said support means comprising a first elongate rail means, said laser means including a laser adjustably mounted on a first carriage means, said first carriage means being slidable along said first elongate rail means;

second elongate rail means secured at right angles to said first rail means for extending beneath the centerline of said vehicle, said second elongate rail means being adapted to carry measuring instruments, adjustable support means for horizontally supporting said first and second rail means above a base; a second carriage means slideable along said second elongate rail means, said second carriage means including a beam splitting laser target comprising:

a housing adjustably mounted thereon, said housing havig first opposing slots in alignment with the direction of projection of the laser beam portions, said housing having second elongate slots located at right angles to said first opposing slots, at least two beam splitting means mounted in said housing to deflect portions of said vertical beam portion entering one of said first opposing slots in different directions through the other of said second elongate slots, the remainder of the vertical beam portion and portions of the horizontal beam portion passing through said beam splitting laser target.

2. An apparatus according to claim 1 wherein said first and second elongate rail means include indicia spaced at predetermined intervals along said rail means, and said first and second carriage means include sensing means for sensing said indica to determine the respective positions of said first and second carriage means on said first and second elongate rail means.

3. An apparatus according to claim 1 wherein said horizontally extending beam portion and said vertically extending beam portion spread at the distance of projection of the beam portion from the laser increases.

4. An apparatus according to claim 1 wherein said horizontal beam portion and said vertical beam portion intersect.

5. An apparatus according to claim 1 wherein said first carriage means is slidable along said first elongate rail means to position said vertical beam portion beneath the vehicle and at the sides of said vehicle.

6. An apparatus according to claim 1 wherein said laser means includes means to move said laser relative to said first carriage means to raise and lower said horizontal datum plane, and said laser is pivotally movable relative to said first carriage means.

7. A laser gauging apparatus for measuring a vehicle during construction of and repair of said vehicle, said apparatus comprising:

support means positionable below said vehicle;

laser means mounted on said support means for projecting at least one horizontally extending beam portion beneath said vehicle, said horizontal beam portion defining a horizontal datum plane under said vehicle from which measurements to said vehicle are obtainable, said laser means additionally projecting a vertical beam portion which defines a vertical datum plane, said support means comprising a first elongate rail means, said laser means including a laser adjustably mounted on a first carriage means, said first carriage means being slidable along said first elongate rail means;

second elongate rail means secured at right angles to said first rail means for extending beneath the centerline of said vehicle, said second elongate rail means being adpated to carry measuring instruments, adjustable support means for horizontally supporting said first and second rail means above a base;

third carriage means slidably mounted to said second elongate rail means, said third carriage means being adjustable to said second elongate means to ensure said third carriage means lies in a plane parallel to said horizontal datum plane, base frame members mounted to said third carriage means and extending parallel to said first elongate rail means beneath the front end of said vehicle to define a base frame, upstanding frame members extending upwardly of said base frame and beside said vehicle, an upper horizontally extending frame member lying in a vertical plane defined by one of the lower base frame members, and at least one pointer extending downwardly from said horizontal frame member toward the vehicle and at least one pointer extending into the side of the vehicle from the upstanding frame members, and wherein said third carriage means includes a first laser target, said base frame members includes stabilizer members for engaging the base, said stabilizer members each including a second laser target, the first and second laser targets ensuring said third carriage means and base members extend horizontally.

8. An apparatus according to claim 7 wherein said first and second elongate rail means include indicia spaced at predetermined intervals along said rail means, and said first and second carriage means include sensing means for sensing said indicia to determine the respective positions of said first and second carriage means on said first and second elongate rail means.

9. An apparatus according to claim 7 wherein said horizontally extending beam portion and said vertically extending beam portion spread at the distance of projection of the beam portion from the laser increases.

10. An apparatus according to claim 7 wherein said horizontal beam portion and said vertical beam portion intersect.

11. An apparatus according to claim 7 wherein said first carriage means is slidable along said first elongate rail means to position said vertical beam portion beneath the vehicle and at the sides of said vehicle.

12. An apparatus according to claim 7 wherein said laser means includes means to move said laser relative to said first carriage means to raise and lower said horizontal datum plane, and said laser is pivotally movable relative to said first carriage means.

13. A beam splitting laser target for measuring a vehicle with a laser beam during construction of and repair of said vehicle, said beam splitting laser target including:

carriage means adapted to move along an elongate rail;

a housing adjustably mounted on said carriage means, said housing having first opposing slots in alignment with the direction of projection of the laser beam, said housing having second elongate slots located at right angles to said first opposing slots; and, at least two beam splitting means mounted in said housing to deflect one portion of said beam entering one of said first opposing slots in a first direction through one of said second slots and to deflect a second portion of said beam entering the one of the first opposing slots in a second direction through the other of said second opposing slots, the remainder of said beam entering said housing passing through the other slot of said first opposing slots.

14. A beam splitting laser target according to claim 13 wherein said target includes at least two mirrors in spaced apart relation for deflecting portions of said beam through the second opposing slots.

15. A beam splitting target according to claim 14 including four vertically spaced apart and aligned mirrors wherein the upper two mirrors deflect portions of the beam in one direction and the lower two mirrors deflect portions of the beam in a second direction.

16. A beam splitting laser target according to claim 14 wherein the said elongate slots are vertically elongate, said first opposing slots each having the shape of a cross.

17. A beam splitting laser target according to claim 13 including first adjustment means for pivoting said housing relative to said carriage means to align the first opposing slots in a vertical plane.

18. A beam splitting laser target according to claim 17 further including second adjustment means for horizontally displacing said housing relative to said carriage means.

19. A beam splitting laser target according to claim 13 wherein said housing includes indicia adjacent the one of the first opposing slots to facilitate alignment of said one of the first opposing slots with said laser beam.

20. A beam splitting laser target according to claim 19 wherein said first opposing slots extend vertically and further include horizontally extending slot portions to permit the travel of a horizontal laser beam portion therethrough.

* * * * *

UNITED STATES PATENT AND TRADEMARK OFFICE
CERTIFICATE OF CORRECTION

PATENT NO. : 4,630,379

DATED : December 23, 1986

INVENTOR(S) : John T. Wickmann; Richard Olak; Guy N. Chartier; Harold Swann

It is certified that error appears in the above-identified patent and that said Letters Patent is hereby corrected as shown below:

Front Page; First Column:

Inventors: "John T. Wickmann, Omemee; Richard Olak, Peterborough, both of Canada" should read --John T. Wickmann, Omemee; Richard Olak, Peterborough; Guy N. Chartier, West Hill; Harold Swann, Toronto, all of Canada--

Column 1, line 44,    "form" should read --from--

Column 2, line 7,    "measures in is not" should read --measures is not--
       line 13,   "instruements" should read --instruments--
       line 29,   "otained." should read --obtained.--

Column 3, line 31,    "instruement" should read --instrument--

Column 5, line 57,    "T-shapped" should read --T-shaped--
       line 61,   "a exploded" should read --an exploded--
       line 64,   "emobodiment" should read --embodiment--

Column 6, line 48,    "pluged" should read --plugged--

Column 7, line 19,    "botton 62" should read --button 62--
       line 48,   "carraige" should read --carriage--
       line 53,   "groves" should read --grooves--

Column 9, line 43,    "embeded" should read --embedded--

Column 10, line 39,    "target when" should read --target then--
       line 60,   "said least" should read --at least--

UNITED STATES PATENT AND TRADEMARK OFFICE
CERTIFICATE OF CORRECTION

PATENT NO. : 4,630,379

DATED : December 23, 1986

INVENTOR(S) : John T. Wickmann; Richard Olak; Guy N. Chartier; Harold Swann

It is certified that error appears in the above-identified patent and that said Letters Patent is hereby corrected as shown below:

Column 11, line 9, "base; a" should read --base; and--
           line 14, "havig" should read --having--
           line 34, "spread at" should read --spread as--

Column 12, line 35, "spread at" should read --spread as--

Column 13, line 13, "the said elongate" should read --the second elongate--

Signed and Sealed this

Twelfth Day of July, 1988

Attest:

DONALD J. QUIGG

*Attesting Officer*  *Commissioner of Patents and Trademarks*